Patented June 21, 1938

2,121,695

UNITED STATES PATENT OFFICE 2,121,695

POLYMERIZATION PROCESS

Rowland Hill, Blackley, Manchester, England, assignor to Imperial Chemical Industries Limited, a corporation of Great Britain No Drawing. Application October 13, 1936, Serial No. 105,444. In Great Britain October 23, 1935

3 Claims. (Cl. 260—2)

This invention relates to a process for the manufacture of valuable polymerization products from cyclohexene oxide.

It is known to obtain resinous polymers by subjecting cyclohexene oxide to very high pressures for several days in presence of a small amount of benzoyl peroxide.

According to the present invention I obtain resinous polymers by treating cyclohexene oxide in the presence of an active earth or clay as polymerization catalyst. By an active earth or clay I mean a finely-divided, highly-absorbent clay or earth such as, for example, bentonite, fuller's earth or talc or a diatomaceous earth such as kieselguhr.

In carrying the invention into effect it is not necessary to use very high pressures. Thus, in presence of active earth catalysts polymerization may conveniently be effected at atmospheric pressures by the application of moderate heat. Polymerization may be carried out in presence or absence of a solvent or diluent. The reaction after it is initiated is highly exothermic and may be controlled by cooling. After the initial violent reaction subsides the reaction mixture is heated to maintain reaction temperature until a product, of the desired degree of condensation is obtained.

The polymerization products obtained according to the invention are usually in the form of a hard, somewhat brittle, transparent mass. The products are readily soluble in organic solvents such as benzene, toluene or turpentine and in drying oils such as linseed oil. Because of their solubility in organic media and their other physical properties, the polymerization products are valuable ingredients for varnish compositions, nitrocellulose lacquers and the like.

The following example, in which the parts are by weight, illustrates but does not limit the invention:

Example

One (1) part kieselguhr is suspended in 50 parts cyclohexene oxide ("Organic Syntheses", vol. 5, page 35, London, 1925), the mixture is heated to 100° C. to initiate the reaction in a vessel fitted with a reflux condenser. After the initial violent reaction subsides the temperature is adjusted to 110 to 115° C. Polymerization, accompanied by an increase in viscosity, is rapid at first. After 4-6 hours, the reaction mixture changes from a mobile into a moderately viscous fluid at reaction temperature. After 40 hours, the reaction mixture is very viscous and the viscous mass is then dissolved in benzene, boiled with a small amount (2 parts) of active carbon and filtered to remove kieselguhr. The benzene is then evaporated from the filtrate by heating at 80° C. under reduced pressure (20–30 mm.). The residue so obtained is a pale straw-colored, hard, somewhat brittle transparent resin. It dissolves readily in cold benzene, toluene or turpentine but is insoluble in cold methylated spirits or ethylene glycol monoethyl ether. It is freely soluble in linseed oil, tung oil or a linseed "stand" oil.

The resin produced in accordance with the foregoing example is in addition to being compatible with drying oils also compatible with rosin modified glyceryl phthalate resins and other rosin modified polyhydric alcohol-polycarboxylic acid resins. The resin of the foregoing example is also compatible in equal proportions with nitrocellulose and ethyl cellulose, and with cellulose acetate in the ratio of 60 parts of the polymer to 100 parts of the acetate.

It is to be observed that although the alkylene oxides can be polymerized by a large number of agents such as calcium chloride, metallic sodium, ultra violet light, etc., these agents are ineffective for polymerizing cyclohexene oxide, and the other oxides mentioned herein.

The present invention is applicable to all carbocyclic epoxy compounds in which the oxygen is linked to adjacent carbon atoms which are both members of a carbocyclic group. I may for instance use alkyl substituted cyclohexene oxides, e. g., methyl, dimethyl, isopropyl, butyl, etc., cyclohexene oxides as well as dihydronaphthalene oxides. Partially or completely hydrogenated substituted or unsubstituted dihydronaphthalene oxides may also be used. Carbocyclic epoxy compounds containing less than six carbon atoms may also be used. Compounds of the kind mentioned herein may be interpolymerized, as for instance by using any combination of these compounds. The preferred materials, however, are the carbocyclic epoxy compounds of the hydroaromatic series such as cyclohexene oxide.

As many apparently widely different embodiments of this invention may be made without departing from the spirit and scope thereof, it is to be understood that I do not limit myself to the specific embodiments thereof except as defined in the appended claims.

I claim:

1. A process for producing polymers which comprises heating in the presence of a catalyst an epoxy compound in which the oxygen is linked to adjacent carbon atoms in a carbocyclic ring, and continuing the heating until said epoxy compound is polymerized, said catalyst being selected from the class of active earths and clays.

2. In a process for making resins from cyclohexene oxide the step which comprises heating cyclohexene oxide with an active earth.

3. A process which comprises heating cyclohexene oxide with an active earth and after the reaction has been initiated maintaining the temperature from 110 to 115° C. until a resinous product soluble in drying oil is obtained.

ROWLAND HILL.